United States Patent
Amaral et al.

(10) Patent No.: US 8,434,999 B2
(45) Date of Patent: May 7, 2013

(54) BIMETALLIC SPLINE SEAL

(75) Inventors: Sergio Daniel Marques Amaral, Simpsonville, SC (US); Gary Michael Itzel, Simpsonville, SC (US); Xiuzhang James Zhang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 573 days.

(21) Appl. No.: 12/731,186

(22) Filed: Mar. 25, 2010

(65) Prior Publication Data
US 2011/0236183 A1    Sep. 29, 2011

(51) Int. Cl.
*F01D 11/00*    (2006.01)

(52) U.S. Cl.
USPC ........ 415/136; 415/138; 415/139; 415/174.2; 415/217.1; 415/229

(58) Field of Classification Search .................. 415/136, 415/138, 139, 173.1, 174.2, 191, 208.1, 217.1, 415/229; 277/644, 647, 654, 614
See application file for complete search history.

(56) References Cited

U.S. PATENT DOCUMENTS

| | | | | |
|---|---|---|---|---|
| 1,857,961 A | * | 5/1932 | Lamb | 277/413 |
| 3,975,114 A | * | 8/1976 | Kalkbrenner | 415/210.1 |
| 4,415,309 A | | 11/1983 | Atterbury | |
| 4,537,024 A | * | 8/1985 | Grosjean | 60/791 |
| 4,658,847 A | * | 4/1987 | McCrone | 137/72 |
| 5,624,227 A | | 4/1997 | Farrell | |
| 5,988,975 A | | 11/1999 | Pizzi | |
| 6,199,871 B1 | * | 3/2001 | Lampes | 277/614 |
| 6,464,457 B1 | | 10/2002 | Morgan et al. | |
| 7,887,286 B2 | * | 2/2011 | Abgrall et al. | 415/119 |
| 8,052,155 B2 | * | 11/2011 | Amos et al. | 277/644 |
| 8,210,799 B1 | * | 7/2012 | Rawlings | 415/135 |
| 2005/0220611 A1 | * | 10/2005 | Bhate et al. | 415/173.3 |
| 2008/0007008 A1 | | 1/2008 | Hoebel et al. | |
| 2009/0115141 A1 | | 5/2009 | Simmons | |

FOREIGN PATENT DOCUMENTS

| | | |
|---|---|---|
| DE | 10225264 A1 | 4/2003 |
| JP | 59183003 A | 10/1984 |
| WO | 0070192 A1 | 11/2000 |

OTHER PUBLICATIONS

Search Report from corresponding EP Application No. 11159288.7-1252 dated Jul. 22, 2011.

* cited by examiner

*Primary Examiner* — Igor Kershteyn
(74) *Attorney, Agent, or Firm* — Dority & Manning, P.A.

(57) ABSTRACT

A spline seal for a hot gas path component is provided. The spline seal may include a first metal layer and a second metal layer. The first metal layer may have a first volumetric thermal expansion coefficient. The second metal layer may be disposed adjacent the first metal layer and have a second volumetric thermal expansion coefficient. The second volumetric thermal expansion coefficient may be higher than the first volumetric thermal expansion coefficient. When the spline seal is exposed to a heat source, the first and second metal layers may deform to provide a seal between the hot gas path component and an adjacent hot gas path component.

18 Claims, 3 Drawing Sheets

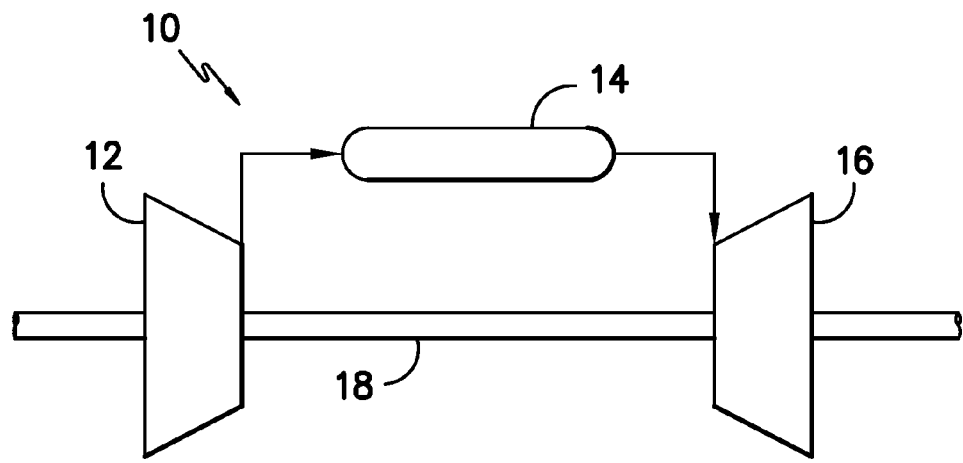
FIG. -1-
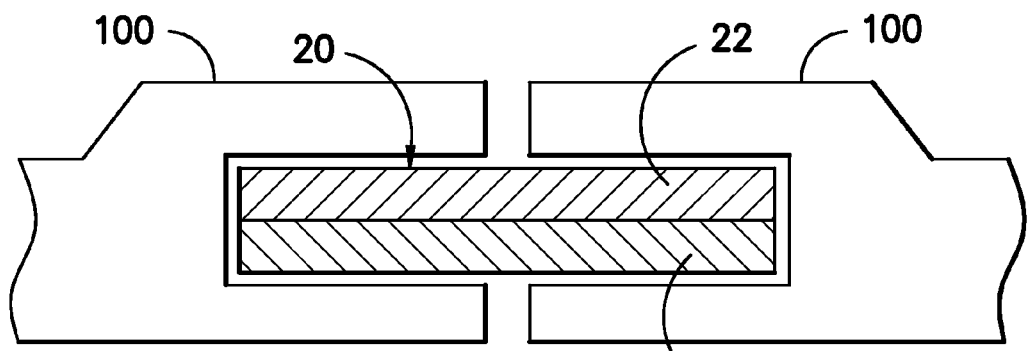
FIG. -2-
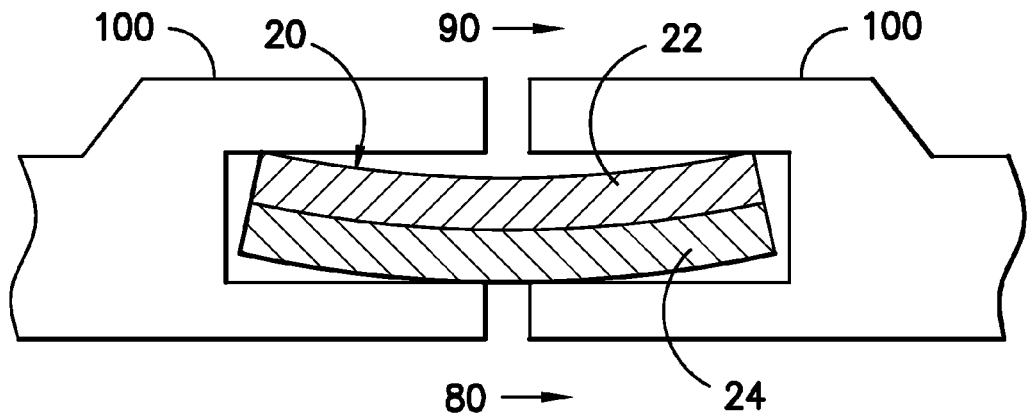
FIG. -3-

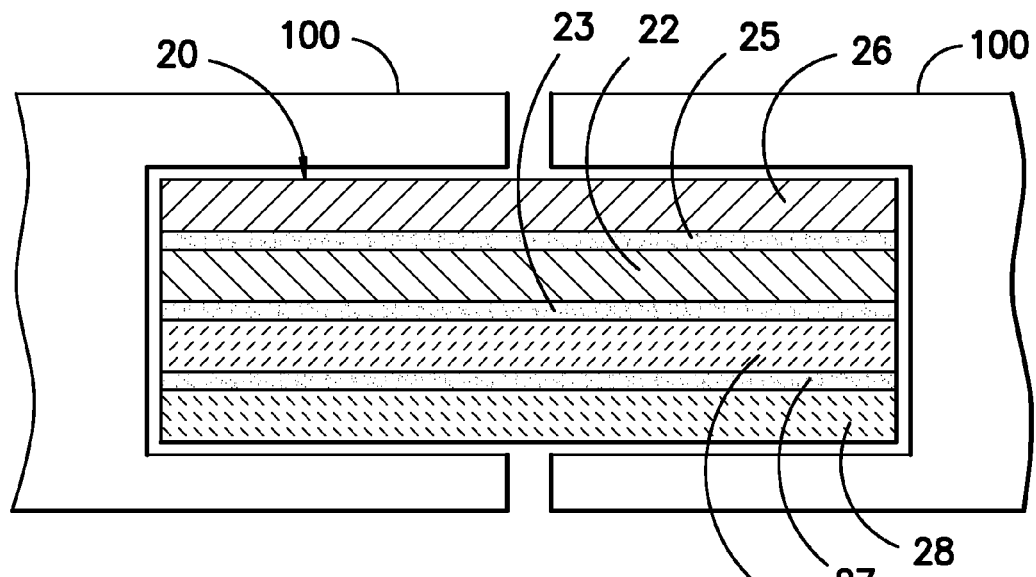
FIG. -4-
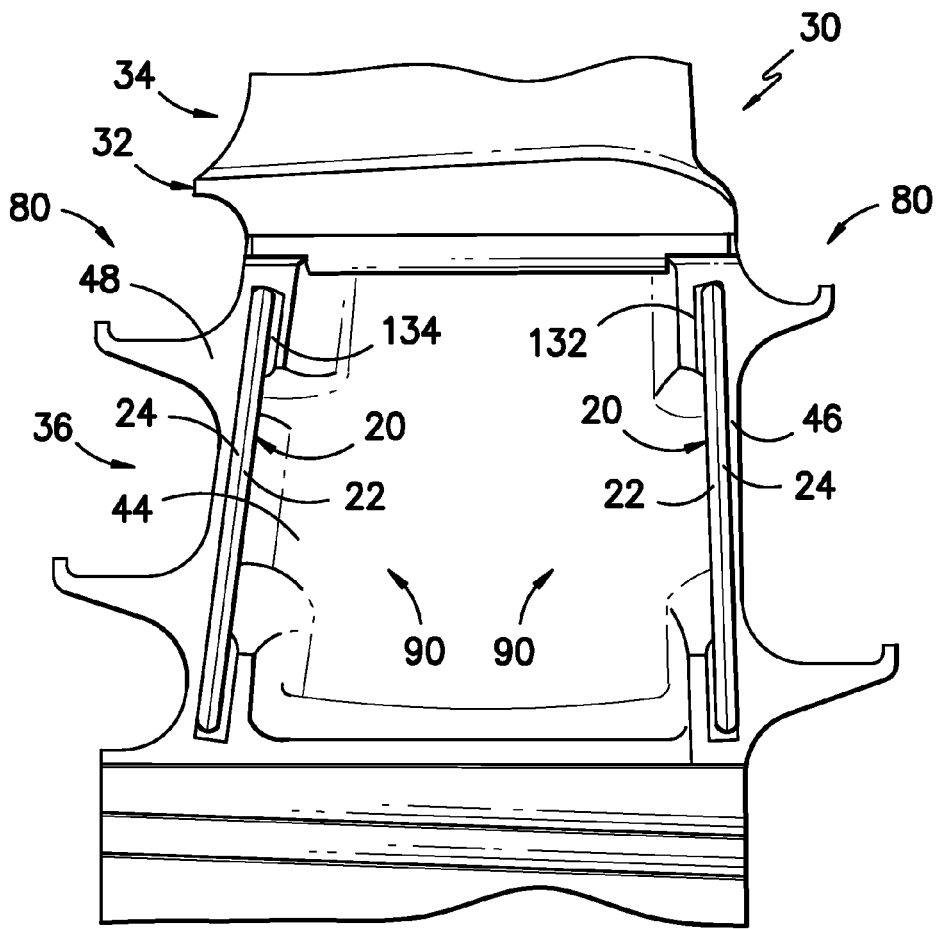
FIG. -5-

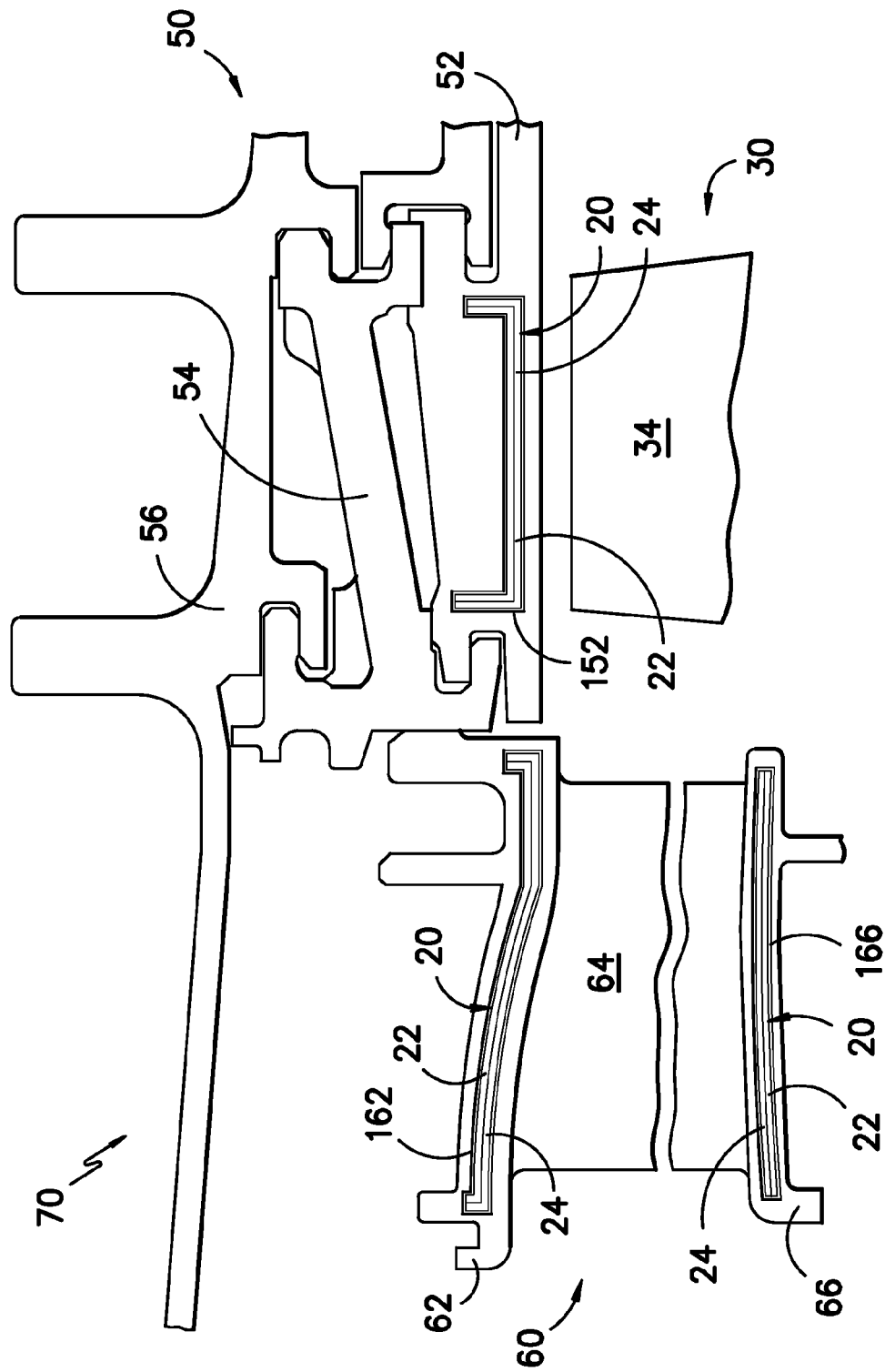
FIG. -6-

BIMETALLIC SPLINE SEAL

FIELD OF THE INVENTION

The subject matter disclosed herein relates generally to hot gas path components, and more specifically to spline seals for sealing hot gas path components. More specifically, the subject matter disclosed herein relates to bimetallic spline seals for providing a seal between adjacent hot gas path components.

BACKGROUND OF THE INVENTION

Gas turbine systems are widely utilized in fields such as power generation. A conventional gas turbine system includes a compressor, a combustor, and a turbine. During operation of the gas turbine system, various components in the system are subjected to high temperature flows. Many of the components, known as hot gas path components, are disposed in annular arrays about an axis of the gas turbine system. Further, many of the components are positioned adjacent to other components, either in annular arrays or in other positions. For example, gas turbine blades and nozzles are positioned in annular arrays, while transition pieces are positioned adjacent to stage one turbine nozzles. Frequently, gaps exist between adjacent components. These gaps may allow for leakage of the high temperature flows from the hot gas path, resulting in decreased performance, efficiency, and power output of the gas turbine system.

Further, since higher temperature flows generally result in increased performance, efficiency, and power output of the gas turbine system, the hot gas path components must be cooled to allow the gas turbine system to operate at increased temperatures. Various strategies are known in the art for cooling various gas turbine system components. For example, a cooling medium may be routed from the compressor and provided to various hot gas path components. However, the gaps between adjacent components may allow for the cooling medium to mix with the high temperature flows, resulting in further decreased performance, efficiency, and power output of the gas turbine system.

Various strategies are known in the art to prevent gas turbine system losses due to leakage and mixing. For example, sealing mechanisms, such as leaf seals, spring seals, and pins, have been utilized to seal the gaps between various adjacent hot gas path components. However, as the temperatures of hot gas path flows utilized in gas turbine systems are increased, and as hot gas path components are subjected to increased movement within gas turbine systems, these sealing mechanisms may no longer be effective to seal gaps and prevent leakages and mixing. For example, as the various hot gas path components deform due to temperature changes and move radially, circumferentially, and axially with respect to one another, the sealing mechanism may fail to respond to these changes and fail to effectively seal gaps between the hot gas path components.

Thus, a spline seal for a hot gas path component is desired in the art. For example, a spline seal that responds to temperature changes and temperature gradients would be advantageous. Further, a spline seal that provides effective sealing when large temperature changes or temperature gradients are present would be advantageous.

BRIEF DESCRIPTION OF THE INVENTION

Aspects and advantages of the invention will be set forth in part in the following description, or may be obvious from the description, or may be learned through practice of the invention.

In one embodiment, a spline seal for a hot gas path component is provided. The spline seal may include a first metal layer and a second metal layer. The first metal layer may have a first volumetric thermal expansion coefficient. The second metal layer may be disposed adjacent the first metal layer and have a second volumetric thermal expansion coefficient. The second volumetric thermal expansion coefficient may be higher than the first volumetric thermal expansion coefficient. When the spline seal is exposed to a heat source, the first and second metal layers may deform to provide a seal between the hot gas path component and an adjacent hot gas path component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic illustration of a gas turbine system according to one embodiment of the present disclosure;

FIG. 2 is a front view of a spline seal according to one embodiment of the present disclosure;

FIG. 3 is a front view of a spline seal according to another embodiment of the present disclosure;

FIG. 4 is a front view of a spline seal according to yet another embodiment of the present disclosure;

FIG. 5 is a side view of a bucket assembly according to one embodiment of the present disclosure; and FIG. 6 is a side view of a turbine stage according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. The system 10 may include a compressor 12, a combustor 14, and a turbine 16. Further, the system 10 may include a plurality of compressors 12, combustors 14, and turbines 16. The compressor 12 and turbine 16 may be coupled by a shaft 18. The shaft 18 may be a single shaft or a plurality of shaft segments coupled together to form shaft 18.

The gas turbine system 10 may include a plurality of hot gas path components 100. A hot gas path component is any component of the system 10 that is at least partially exposed to a high temperature flow of gas through the system 10. For example, bucket assemblies, nozzle assemblies, shroud assemblies, transition pieces, stage one turbine nozzles, retaining rings, and compressor exhaust components are all hot gas path components. However, it should be understood that the hot gas path component 100 of the present invention is not limited to the above examples, but may be any component that is at least partially exposed to a high temperature flow of gas, or any component that is subjected to multiple flows that have a substantial temperature gradient with respect to one another. Further, it should be understood that the hot gas path component 100 of the present disclosure is not limited to components in gas turbine systems 10, but may be any piece of machinery or component thereof that may be exposed to high temperature flows or to multiple flows with a substantial temperature gradient with respect to one another.

When hot gas path components 100 are joined together in a system 10, there are generally gaps between the components. These gaps can allow, for example, a hot gas path flow 80 to escape between the components, or a cooling medium flow 90 to enter the hot gas path between the components. Thus, an effective seal is required between the components.

FIGS. 2 and 3 illustrate exemplary embodiments of a spline seal 20 for a hot gas path component 100 of the present disclosure. The spline seal 20 may be a bimetallic strip that includes a plurality of metal layers, each metal layer having a volumetric thermal expansion coefficient.

In general, a bimetallic strip includes at least two layers of different metals which expand at different rates as they are heated. For example, typically known bimetallic strips include a layer of steel and a layer of copper, or a layer of steel and a layer of brass. However, it should be understood that the metal layers used in the spline seals 20 of the present disclosure are not limited to steel, copper, or brass, but may be any metals or metallic alloys or compounds. For example, the metal layers used in the spline seals 20 may be metals commonly used in gas turbine components, such as Rene N4, Rene N5, or GTD-111 DS. The strips may be joined using any joining technique known in the metal joining art. For example, the strips may be joined using joining techniques such as riveting, bolting, soldering, clinching, adhering, brazing, and welding.

Each of the metal layers of the present disclosure may have a volumetric thermal expansion coefficient. The thermal expansion coefficient is a thermodynamic property of a material. For example, the volumetric thermal expansion coefficient for a material can be expressed using the equation $\alpha_V = (1/V)(dV/dT)$, where $\alpha_V$ is the volumetric thermal expansion coefficient, V is the volume of the material, and dV/dT is the change in the volume of the material with respect to the change in the temperature of the material. Thus, the volumetric thermal expansion coefficient measures the fractional change in volume per degree change in temperature at a constant pressure.

Thus, when the spline seal 20 of the present invention is exposed to a heat source, the various metal layers of the spline seal 20 may expand at different rates according to different volumetric thermal expansion coefficients, causing the layers, and thus the spline seal 20, to deform. For example, the spline seal 20 may bend in one direction when heated, and bend in the opposite direction when cooled below its normal temperature. In general, the metal layer with the higher volumetric thermal expansion coefficient is disposed on the outer side of a bent bimetallic strip, such as a spline seal 20, when the strip is heated, and on the inner side when cooled.

In an exemplary embodiment, the spline seal 20 may include a first metal layer 22 and a second metal layer 24. The first metal layer 22 may have a first volumetric thermal expansion coefficient. The second metal layer 24 may be disposed adjacent the first metal layer 22 and may have a second thermal expansion coefficient. In one embodiment, the second thermal expansion coefficient may be higher than the first thermal expansion coefficient.

It should be understood that the spline seal 20 of the present disclosure is not limited to a first metal layer 22 and a second metal layer 24. For example, in one embodiment as shown in FIG. 4, the spline seal 20 may include a third metal layer 26 disposed adjacent the first metal layer 22 and having a third volumetric thermal expansion coefficient. The third volumetric thermal expansion coefficient may be lower than, substantially identical to, or higher than the first volumetric thermal expansion coefficient. In another embodiment as shown in FIG. 4, the spline seal 20 may include a fourth metal layer 28 disposed adjacent the second metal layer 24 and having a fourth volumetric thermal expansion coefficient. The fourth volumetric thermal expansion coefficient may be lower than, substantially identical to, or higher than the second volumetric thermal expansion coefficient. Further, the spline seal 20 may include any number of metal layers, each of the metal layers having a volumetric thermal expansion coefficient. The volumetric thermal expansion coefficient of each layer may be lower than, substantially identical to, or higher than the volumetric thermal expansion coefficient of any other layer.

It should be understood that the spline seal 20 and various layers of the present disclosure may have any shape known in the art. For example, in one embodiment, the spline seal 20 and the various layers may have rectangular cross-sections, as shown in FIGS. 2 through 4. However, in another embodiment, the spline seal 20 may have a cylindrical cross-section and the various layers may have partially cylindrical cross-sections. Further, in other embodiments, the spline seal 20 and the various layers may have any cross-sectional shapes known in the art that may provide a seal between adjacent hot gas path components 100.

In an exemplary embodiment as shown in FIG. 4, the spline seal 20 may further include at least one thermal barrier layer 23. The thermal barrier layer 23 may be disposed between various metal layers of the spline seal 20, such as between the first metal layer 22 and the second metal layer 24. The thermal barrier layer 23 may act to prevent or minimize heat exchange between the various metal layers of the spline seal, such as when one layer is exposed to a first heat source at a first temperature and a second layer is exposed to a second heat source at a second temperature. By minimizing heat exchange between the metal layers, the thermal bather layer 23 may maximize the thermal gradient between the metal layers, thus maximizing the deformation and sealing capability of the spline seal 20.

The thermal barrier layer 23 may be layer of low conductivity thermal insulation, and may be made of any material that can minimize heat exchange. For example, in one embodiment, the thermal barrier layer 23 may be a ceramic thermal barrier layer. In another embodiment, the thermal barrier layer 23 may be air.

It should further be understood that a thermal barrier layer or layers may be disposed between each of the metal layers. For example, in one embodiment as shown in FIG. 4, the spline seal 20 may include metal layers 22, 24, 26, and 28, as well as thermal barrier layers 23, 25, and 27. Further, it should be understood that the thermal barrier layers may be disposed between some of the metal layers, but not between others.

When the spline seal 20 of the present disclosure is exposed to a heat source, the first and second metal layers 22 and 24, as well as any other layers such as a third metal layer 26 or a fourth metal layer 28, may deform to provide a seal between a hot gas path component 100 and adjacent hot gas path component 100, such as by causing the spline seal 20 to bend, as discussed above. In an exemplary embodiment, the deformation of the first and second metal layers 22 and 24 may cause the spline seal 20 to deform from a first profile to a second profile.

For example, as shown in FIG. 2, the spline seal 20 may have a substantially flat first profile. However, the spline seal 20 may is not limited to a substantially flat first profile. For example, in various embodiments, the spline seal 20 may have a substantially U-shaped profile, a substantially S-shaped profile, a substantially W-shaped profile, or a substantially N-shaped profile. Further, it should be understood that the first profile of the spline seal 20 is not limited to the aforementioned profiles, but may be any profile known in the art that would provide a seal upon exposure to a heat source. For example, the spline seal 20 may have a first profile suitable for a bucket assembly 30 (see FIG. 5), a shroud assembly 50 (see FIG. 6), a nozzle assembly 60 (see FIG. 6), or any other hot gas path component 100 known in the art.

Further, as shown in FIG. 3, the spline seal 20 may have a substantially U-shaped second profile. However, the spline seal 20 may is not limited to a substantially U-shaped second profile. For example, in various embodiments, the spline seal 20 may have a substantially flat profile, a substantially S-shaped profile, a substantially W-shaped profile or a substantially N-shaped profile. Further, it should be understood that the second profile of the spline seal 20 is not limited to the aforementioned profiles, but may be any profile known in the art that would provide a seal upon exposure to a heat source. For example, the spline seal 20 may have a second profile suitable for a bucket assembly 30 (see FIG. 5), a shroud assembly 50 (see FIG. 6), a nozzle assembly 60 (see FIG. 6), or any other hot gas path component 100 known in the art.

When the spline seal 20 is exposed to a heat source, the first and second metal layers 22 and 24, as well as any other layers such as a third metal layer 26 or a fourth metal layer 28, may deform to provide a seal between a hot gas path component 100 and an adjacent hot gas path component 100. For example, the hot gas path component 100 and the adjacent hot gas path component 100 may be bucket assemblies, nozzle assemblies, shroud assemblies, transition pieces, stage one turbine nozzles, retaining rings, or compressor exhaust components. Further it should be understood that the hot gas path component 100 and the adjacent hot gas path component 100 do not have to be the same component. For example, in one embodiment, the hot gas path component 100 may be a transition piece, and the adjacent hot gas path component 100 may be a stage one turbine nozzle. Further, it should be understood that the hot gas path components 100 and the adjacent hot gas path components 100 of the present disclosure are not limited to the above components, but may be any components that are at least partially exposed to a high temperature flow of gas.

As discussed above, the heat source may be a hot gas path flow 80. Further, in an exemplary aspect of an embodiment, the spline seal 20 may be disposed such that the first metal layer 22, or any other outer metal layer such as a third metal layer 26, may be disposed to a first heat source, while the second metal layer 24, or any other outer metal layer such as a fourth metal layer 28, may be disposed to a second heat source. For example, the first heat source may be a cooling medium flow 90, and the second heat source may be a hot gas path flow 80. Thus, when the spline seal 20 is exposed to the cooling medium flow 90 and the hot gas path flow 80, and the first and second metal layers 22 and 24, as well as any other layers such as a third metal layer 26 or a fourth metal layer 28, deform to provide a seal between the hot gas path component 100 and adjacent hot gas path component 100, the seal may prevent, for example, the hot gas path flow 80 from escaping between the components, or the cooling medium flow 90 from entering the hot gas path between the components and mixing with the hot gas path flow 80.

In an exemplary aspect of an embodiment as shown in FIG. 5, the spline seal 20 may be disposed in a bucket assembly 30 and configured to provide a seal between the bucket assembly 30 and an adjacent bucket assembly 30. For example, the bucket assembly 30 may include a platform 32, an airfoil 34 extending radially outward from the platform 32, and a shank 36 extending radially inward from the platform 32. The shank 36 may include a pressure side sidewall (not shown), a suction side sidewall 44, an upstream sidewall 46, and a downstream sidewall 48.

The bucket assembly 30 may further include a first spline seal 20 disposed adjacent the upstream sidewall 46 and a second spline seal 20 disposed adjacent the downstream sidewall 48. For example, the first spline seal 20 may be disposed in a channel 132 defined on the upstream sidewall 46, and the second spline seal 20 may be disposed in a channel 134 defined on the downstream sidewall 48. Each of the spline seals 20 may include a plurality of metal layers, such as a first metal layer 22 and a second metal layer 24, as discussed above. When the spline seals 20 are exposed to a heat source, such as when the first metal layer 22 or other outer metal layer is exposed to a cooling medium flow 90 and the second metal layer 24 or other outer metal layer is exposed to a hot gas path flow 80, the first and second metal layers 22 and 24, as well as any other layers such as a third metal layer 26 or a fourth metal layer 28, of each spline seal 20 may expand to provide a seal between the bucket assembly 30 and an adjacent bucket assembly 30.

The bucket assembly 30 may be included in a turbine stage 70, as shown in FIG. 6. For example, the turbine stage 70 may be a first stage, second stage, third stage, or any other stage known in the gas turbine art. The turbine stage 70 may include a plurality of bucket assemblies 30, nozzle assemblies 60, and shroud assembles 50 arranged in an annular fashion around the path of the hot gas flow 80.

A nozzle assembly 60, for example, may include an inner band 66, an outer band 62, and an airfoil 64 disposed between the inner and outer bands 66 and 62. The nozzle assembly 60 may further include a first spline seal or spline seals 20 disposed adjacent the outer band 62 and a second spline seal or spline seals 20 disposed adjacent the inner band 66. For example, the first spline seal 20 may be disposed in a channel 162 defined on the outer band 62, and the second spline seal 20 may be disposed in a channel 166 defined on the inner band 66. Each of the spline seals 20 may include a plurality of metal layers, such as a first metal layer 22 and a second metal layer 24, as discussed above. When the spline seals 20 are exposed to a heat source, such as when the first metal layer 22 or other outer metal layer is exposed to a cooling medium flow 90 and the second metal layer 24 or other outer metal layer is exposed to a hot gas path flow 80, the first and second metal layers 22 and 24, as well as any other layers such as a third metal layer 26 or a fourth metal layer 28, of each spline seal 20 may expand to provide a seal between the inner and outer bands 66 and 62 of the nozzle assembly 60 and the inner and outer bands 66 and 62 of an adjacent nozzle assembly 60.

A shroud assembly 50 may include, for example, a shroud segment 52, shroud hanger 54, and outer casing 56. The shroud assembly 50 may further include a spline seal or pins 20 disposed adjacent the shroud segment 52. For example, the spline seal 20 may be disposed in a channel 152 defined on the shroud segment 52. Each of the spline seals 20 may include a plurality of metal layers, such as a first metal layer 22 and a second metal layer 24, as discussed above. When the spline seals 20 are exposed to a heat source, such as when the first metal layer 22 or other outer metal layer is exposed to a cooling medium flow 90 and the second metal layer 24 or other outer metal layer is exposed to a hot gas path flow 80, the first and second metal layers 22 and 24, as well as any other layers such as a third metal layer 26 or a fourth metal layer 28, of each spline seal 20 may expand to provide a seal between the shroud segment 52 of the shroud assembly 50 and the shroud segment 52 of an adjacent shroud assembly 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spline seal for a hot gas path component, the spline seal comprising:
   a first metal layer having a first volumetric thermal expansion coefficient;
   a second metal layer disposed adjacent and intentionally spaced apart from the first metal layer and having a second volumetric thermal expansion coefficient, the second volumetric thermal expansion coefficient being higher than the first volumetric thermal expansion coefficient; and
   a thermal barrier layer, the thermal barrier layer disposed between the first metal layer and the second metal layer;
   wherein when the spline seal is exposed to a heat source, the first and second metal layers deform to provide a seal between the hot gas path component and an adjacent hot gas path component.

2. The spline seal of claim 1, wherein the first metal layer and the second metal layer are joined by one of riveting, bolting, soldering, clinching, adhering, brazing, or welding.

3. The spline seal of claim 1, wherein the deformation of the first and second metal layers causes the spline seal to deform from a first profile to a second profile.

4. The spline seal of claim 3, wherein the first profile is one of a substantially flat profile, a substantially U-shaped profile, a substantially S-shaped profile, a substantially W-shaped profile, or a substantially N-shaped profile.

5. The spline seal of claim 3, wherein the second profile is one of a substantially flat profile, a substantially U-shaped profile, a substantially S-shaped profile, a substantially W-shaped profile, or a substantially N-shaped profile.

6. The spline seal of claim 1, wherein the thermal barrier layer is a ceramic thermal barrier layer.

7. The spline seal of claim 1, wherein the thermal barrier layer is air.

8. The spline seal of claim 1, further comprising a third metal layer disposed adjacent the first metal layer and having a third volumetric thermal expansion coefficient, the third volumetric thermal expansion coefficient being lower than the first volumetric thermal expansion coefficient.

9. The spline seal of claim 1, further comprising a fourth metal layer disposed adjacent the second metal layer and having a fourth volumetric thermal expansion coefficient, the fourth volumetric thermal expansion coefficient being higher than the second volumetric thermal expansion coefficient.

10. The spline seal of claim 1, further comprising a plurality of metal layers, each of the metal layers disposed adjacent the other metal layers and having a different volumetric thermal expansion coefficient from the other layers.

11. The spline seal of claim 1, wherein the heat source is a hot gas path flow.

12. The spline seal of claim 1, wherein the first metal layer is exposed to a first heat source and the second metal layer is exposed to a second heat source.

13. The spline seal of claim 12, wherein the first heat source is a cooling medium flow and the second heat source is a hot gas path flow.

14. The spline seal of claim 1, wherein the hot gas path component is one of a bucket assembly, a nozzle assembly, a shroud assembly, a transition piece, a stage one turbine nozzle, a retaining ring, or a compressor exhaust component.

15. The spline seal of claim 1, wherein the adjacent hot gas path component is one of a bucket assembly, a nozzle assembly, a shroud assembly, a transition piece, a stage one turbine nozzle, a retaining ring, or a compressor exhaust component.

16. A spline seal for a hot gas path component, the spline seal comprising:
   a first metal layer having a first volumetric thermal expansion coefficient;
   a second metal layer disposed adjacent and intentionally spaced apart from the first metal layer and having a second volumetric thermal expansion coefficient, the second volumetric thermal expansion coefficient being higher than the first volumetric thermal expansion coefficient; and
   a thermal barrier layer, the thermal barrier layer disposed between the first metal layer and the second metal layer;
   wherein when the first metal layer is exposed to a cooling medium flow and the second metal layer is exposed to a hot gas path flow, the first and second metal layers deform, causing the spline seal to deform from a first substantially flat profile to a second substantially U-shaped profile and provide a seal between the hot gas path component and an adjacent hot gas path component.

17. The spline seal of claim 16, wherein the hot gas path component is one of a bucket assembly, a nozzle assembly, a shroud assembly, a transition piece, a stage one turbine nozzle, a retaining ring, or a compressor exhaust component.

18. The spline seal of claim 16, wherein the adjacent hot gas path component is one of a bucket assembly, a nozzle assembly, a shroud assembly, a transition piece, a stage one turbine nozzle, a retaining ring, or a compressor exhaust component.

* * * * *